United States Patent
Narui et al.

(10) Patent No.: US 6,388,662 B2
(45) Date of Patent: *May 14, 2002

(54) METHOD AND APPARATUS FOR ADJUSTING A MONITOR DISPLAY

(75) Inventors: Yoshihisa Narui; Yoshinori Onoue, both of San Diego, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,066

(22) Filed: Sep. 25, 1998

(51) Int. Cl.[7] .............................................. G09G 5/00
(52) U.S. Cl. ..................... 345/207; 345/205; 345/104
(58) Field of Search ................... 345/207, 205, 345/13, 14, 80, 104, 81

(56) References Cited

U.S. PATENT DOCUMENTS

| | | | | |
|---|---|---|---|---|
| 4,683,467 A | * | 7/1987 | Macaulay et al. | 345/207 |
| 5,032,828 A | * | 7/1991 | Hirose et al. | 345/207 |
| 5,243,452 A | * | 9/1993 | Baur | 359/55 |
| 5,434,595 A | * | 7/1995 | Macaulay | 345/207 |
| 5,610,629 A | * | 3/1997 | Baur | 359/55 |
| 5,786,801 A | * | 7/1998 | Ichise | 345/207 |
| 5,917,464 A | * | 6/1999 | Stearns | 345/207 |
| 5,933,126 A | * | 8/1999 | Mori | 345/13 |

* cited by examiner

Primary Examiner—Richard Hjerpe
Assistant Examiner—Kimnhung Nguyen
(74) Attorney, Agent, or Firm—Blakely, Sokoloff, Taylor & Zafman LLP

(57) ABSTRACT

An apparatus to automatically adjust image distortions is disclosed. The apparatus comprises a driver operable to generate images on a screen. The apparatus further comprises a plurality of sensors coupled to the screen. Each sensor detects whether the area under the sensor is illuminated. The apparatus further comprises a circuit coupled to the plurality of sensors and the driver. The circuit is configured to adjust the driver based on illumination of a sub-set of the plurality of sensors.

17 Claims, 8 Drawing Sheets

METHOD AND APPARATUS FOR ADJUSTING A MONITOR DISPLAY

FIELD OF THE INVENTION

The present invention relates to adjusting a display on a monitor. More particularly, the present invention relates to automatically adjusting size, center, and geometrical distortions on a monitor.

BACKGROUND

Monitors are an important element in computer systems. Typically, monitors are coupled to a personal computer and provide the user with a visual interface of the personal computer's data contents. Although, current monitors offer unique packaging and different display qualities, the cathode ray tube ("CRT") remains an integral element in the design of most monitors. The CRT converts an electrical signal into visual information using an electron beam that is modulated and deflected onto a cathodoluminescent screen surface.

Improvements in monitor designs has led to computer systems that provide the user with compact and sharp displays. The design improvements, however, have not led to improvements in the display orientation of the monitors. Conventional monitors typically have built in controls to adjust the positioning and sizing of images. The controls allow the user to alter the deflection angle of the electron beam by increasing/decreasing the magnetic flux created by the deflection coils in a CRT device.

FIG. 1 illustrates one embodiment of a prior art CRT. CRT 100 includes a vacuum tube 106 coupled to screen 110. Deflection coil 105 is used to position magnetic flux 115 around electron beam 120. A control signal (not shown) allows a user to adjust the magnitude of the electric signals on deflection coil 105, thus adjusting the magnitude of magnetic flux 115. The change in magnetic flux 115 increases/decreases deflection angle 130 form the Z-axis, thus varying the position of electron beam 120 on screen 110. Varying the position of beam 120 allows the user to vary the position and orientation of an image displayed on screen 110. Although using control inputs to adjust images on screen 110 creates provides the user with greater flexibility, manual control inputs create a number of disadvantages.

One disadvantage of the conventional control inputs is that the CRT requires multiple adjustments. Typically, CRT's require adjustments because magnetic flux 115's alignment is easily skewed by extraneous magnetic fields. For example, the earth's magnetic field causes distortion in a monitor display. Similarly, an extraneous electrical device can cause a magnetic field that causes distortion in a monitor display. Accordingly, in conventional monitors, the user is required to locate different control inputs on the monitor and manually adjust the distorted image.

FIG. 2 illustrates typical distortions in a conventional monitor display. Image 210 shows an image that is shifted upwards and increase in width as electron beam 120 scans up the vertical axis of screen 110. Conversely image 230 show an image that is shifted downwards and increase in width as electron beam 120 scans down the vertical axis of screen 110. Additionally, images 220 and 240 illustrate image distortion caused by a negative degree rotation and a positive degree rotation, respectively. Accordingly, in the prior art the user is required to adjust the distortions illustrated in FIG. 2 via manual controls.

Another disadvantage of manual control inputs occurs during the manufacturing of computer systems. In particular, during the manufacturing process of computer systems installation of a new monitor requires adjustment of the monitor display to align an image or remove image distortions. The adjustment is necessary because the manufacture is unable to anticipate the different magnetic variance that affect each computer system. Manual adjustment of monitors during the manufacturing process, however, is costly and tedious.

To automate image alignment and distortion correction of newly manufactured monitors, some manufactures introduce a camera and a microprocessor to the manufacturing process. The camera records an image displayed on the monitor and the processor adjusts the displayed image on each monitor. Although the camera and microprocessor automate monitor adjustment, the camera and microprocessor are not available to users outside the manufacturing process. Thus, in non-manufacturing environments the user adjusts distortions via manual controls. Additionally, the camera and microprocessor reduce efficiency in the manufacturing process because the camera and microprocessor introduces extraneous steps to the manufacturing process.

SUMMARY OF THE INVENTION

An apparatus to automatically adjust image distortions is disclosed. The apparatus comprises a driver operable to generate images on a screen. The apparatus further comprises a plurality of sensors coupled to the screen. Each sensor detects whether the area under the sensor is illuminated. The apparatus further comprises a circuit coupled to the plurality of sensors and the driver. The circuit is configured to adjust the driver based on illumination of a sub-set of the plurality of sensors. A method for automatically adjusting image distortions of a video monitor is also disclosed.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method and apparatus used to automatically adjust image distortions on a monitor is disclosed. The apparatus, hereinafter a self adjusting monitor, includes a feedback loop comprising sensors, a converter, a processor, a cathode ray tube ("CRT"), and the CRT's driver mechanism. The self adjusting monitor uses the sensors to determine image location on the CRT's surface and adjusts the image displayed on the screen via the processor and driver circuitry. The feedback loop allows the processor to incrementally change the size, orientation, and location of the displayed image until all distortions are removed. For one embodiment, the monitor comprises a video monitor used in a computer system. For an alternative embodiment, the monitor comprises a flat panel display. The method includes the incremental steps performed by the processor to incrementally change the size, orientation, and location of the displayed image until all distortions are removed.

An intended advantage of an embodiment of the invention is to provide a self adjusting monitor that automatically corrects image distortions. For one embodiment, the self adjustment is used in a manufacturing process to adjust the image display of manufactured monitors. For an alternative embodiment, the self adjustment is used in daily operation of a computer system.

Another intended advantage of an embodiment of the invention is to provide embedded sensors in a CRT screen. The embedded sensor allow automatic adjustment of an image without obstructing the user's primary interface. Yet another intended advantage of an embodiment of the invention is to incorporate self adjusting circuitry in a standard monitor design.

Figure 1:
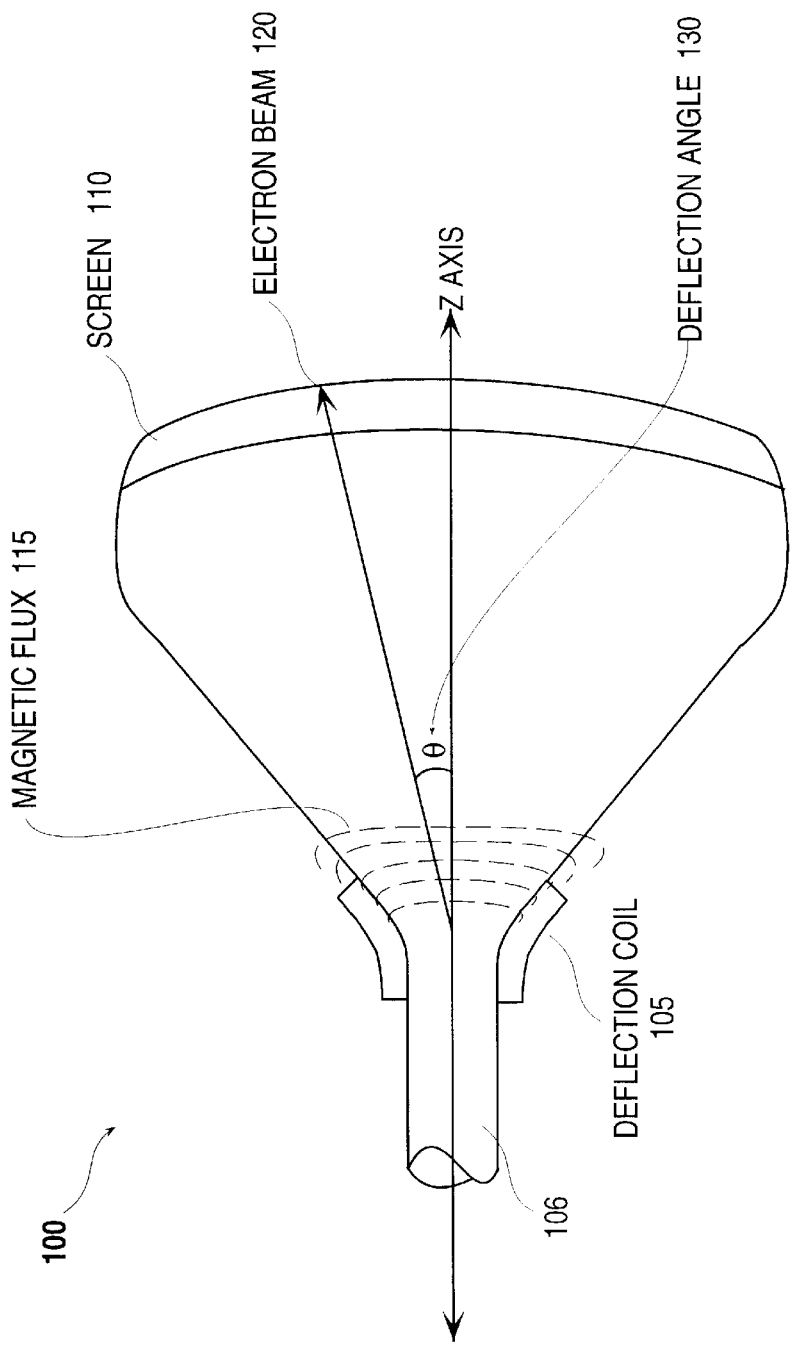
FIG. 1 illustrates a prior art cathode ray tube.
Figure 2:
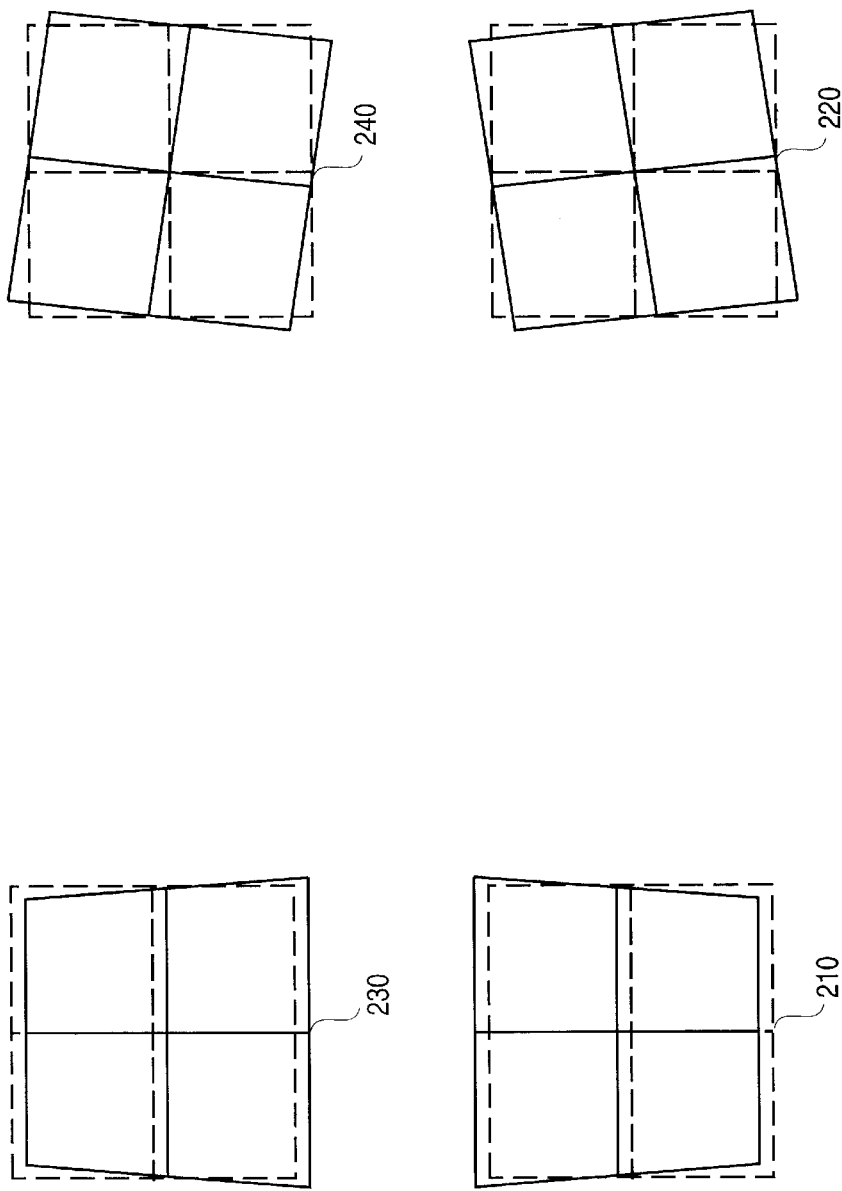
FIG. 2 illustrates image distortions in a prior art monitor.
Figure 3:
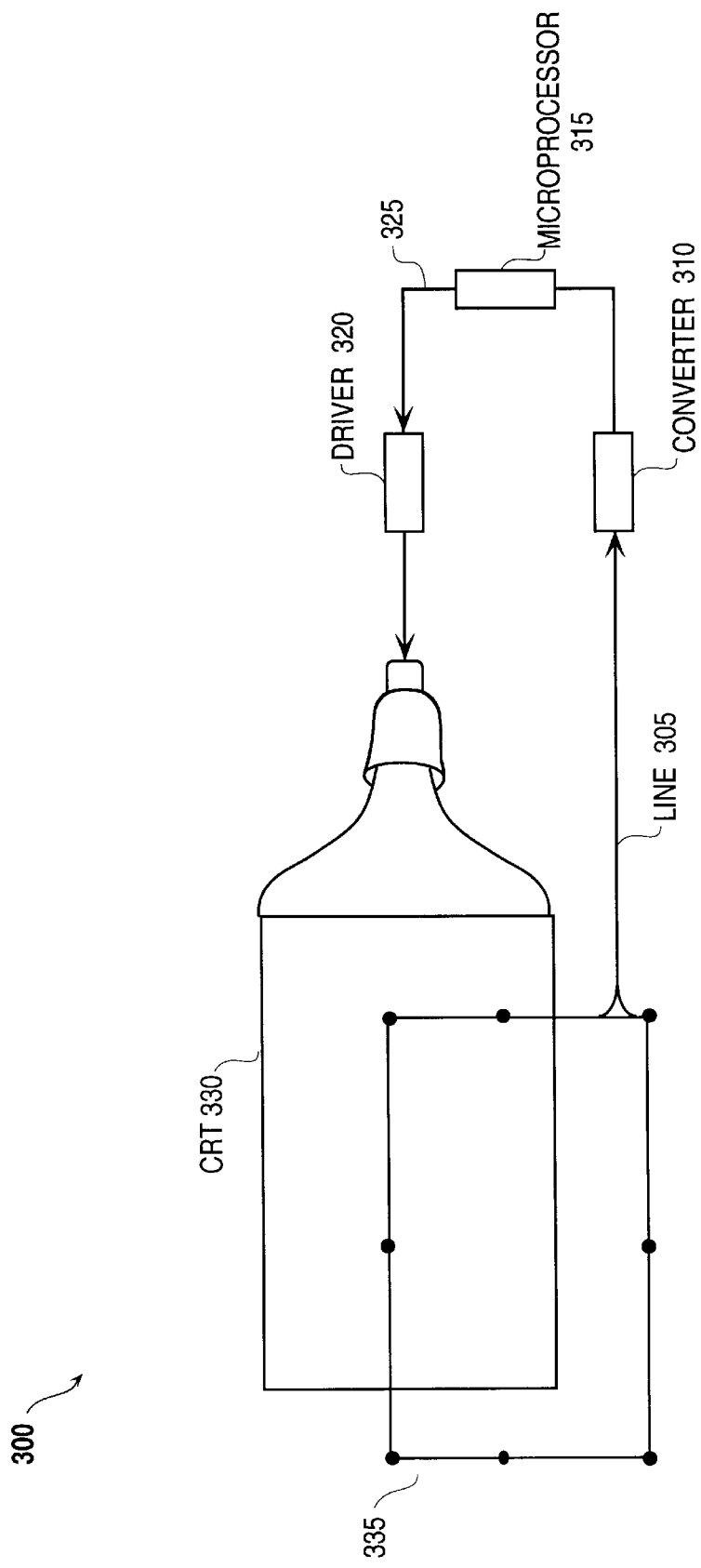
FIG. 3 shows one embodiment of a feed-back device for adjusting image distortions at the CRT surface.

FIG. 3 illustrates one embodiment of a self adjusting monitor. In particular, system 300 removes distortions from images displayed on the screen area of CRT 330. System 300 comprises a cathode ray tube (CRT 330), driver 320, microprocessor 315, converter 310, and sensors 335. As illustrated in FIG. 3, the components of system 300 are coupled in a feed-back loop from CRT 330 to driver 320. CRT 330 displays images via an electron beam (not shown) positioned on the screen of CRT 330. Driver 320 comprises drive circuitry that adjusts the electron beam to vary the size, position, and orientation of an image displayed by CRT 330.

System 300 adjusts the output of driver 320 to remove orientation and geometrical distortions from images displayed by CRT 330. The level of adjustment is determined by sensors 335. Control over the actual adjustments, however, is determined by converter 310 and microprocessor 315. For one embodiment, sensors 335 comprise photo-electric diodes placed on the edge of CRT 330's screen. The photo-electric diodes produce an analog signal indicating whether the surface area beneath a given photo-electric diode is illuminated. For an alternative embodiment, sensors 335 comprise transparent photo-electric diodes incorporated into the anti-reflective screen of CRT 330. The transparent photo electric diodes are not constrained to the edge of the screen and may be placed at any location on CRT 330's screen.

For one embodiment, system 300 includes six photo-electric diodes. The six photo-electric diode produces an analog output indicating the screen illumination created by a predetermined image. The analog outputs are coupled to converter 310 via line 305. Converter 310 transforms the analog signals into a digital signal used in microprocessor 315. In particular, converter 310 produces a binary output indicating whether a set of photoelectric diodes is covering a section of the predetermined image. The binary output is used by microprocessor 315 to adjust CRT 330's electron beam via driver 320. The adjusted image is displayed by CRT 330 and creates an new set of analog outputs from sensor 335. Following the feed-back loop, the new analog outputs are used by microprocessor 315 to readjust the image until the distortions of the image are corrected. For one embodiment, the predetermined image is stored in microprocessor 315. For an alternative embodiment, the predetermined image comprises a white rectangular shape matching the dimensions of CRT 330's screen. Accordingly, all distortions are removed from the predetermined image when all six photo-electric diodes indicate no illumination. To remove the distortions, microprocessor 315 incrementally adjusts the output of driver 320 until the binary output of converter 310 indicates that sensors 335 cover a non-illuminated area.

For one embodiment, system 300 comprises a video monitor in a computer system. The computer system uses system 300 as an interface to display graphic and text information included in the computer system. Accordingly, the computer system uses drive logic and drive circuitry (not shown) in conjunction with driver 320 to control/adjust CRT 330's electron beam, thus providing different images on CRT 330's screen. For one embodiment, driver 320 provides seven control signals to adjust CRT 330's electron beam. The control signals include horizontal size adjust, horizontal center adjust, vertical size adjust, vertical center adjust, rotation adjust, barrel adjust, and trapezoid adjust. Accordingly, based on the data from sensor 335 and converter 310, microprocessor 315 incrementally adjusts a set of the seven control signals to remove distortions from CRT 330's screen.

Figure 4:
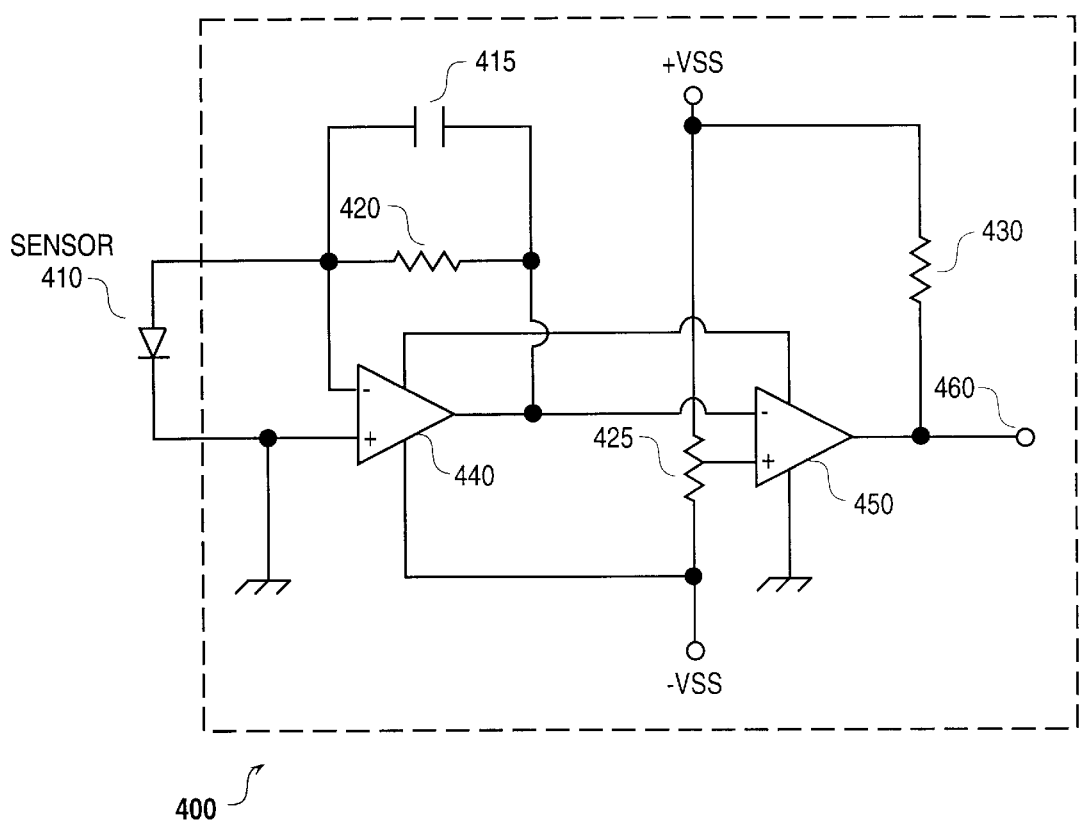
FIG. 4 shows one embodiment of a converter and a sensor included in a feed-back device for adjusting image distortions at the CRT surface.

FIG. 4 illustrates one embodiment of a converter (400) coupled to a sensor (410) in a self adjusting monitor. Converter 400 includes an amplifier, a comparator, resistive elements, and a capacitor. The elements in converter 400 are coupled to transform the analog signal of sensor 410 into a digital signal. For one embodiment, sensor 410 comprises a photo-electric diode with light illumination recognition characteristics that parallel the sensitivity of the human eye.

As shown in FIG. 4, sensor 410 is coupled to both inputs of comparator 440. For one embodiment, sensor 410 outputs a low voltage analog signal indicating the detection of a light source. Accordingly, comparator 440 is used to determine whether the low voltage analog signals is greater than a pre-determined threshold voltage. The threshold voltage is determined by the properties of the photo-electric selected.

Sensor 410 is also coupled to capacitor 415 and resistor 420. Capacitor 415 and resistor 420, in turn, are coupled to the output of amplifier 440 and one input of amplifier 450. The other input of amplifier 450 is coupled to resistor 425 and resistor 430. Both the output of amplifier 450 and resistor 430 are coupled to output 460. Amplifier 450 transforms the output of comparator 440 to digital voltage levels VSS and ground. For one embodiment, VSS equals 35 volts and ground equals 0 volts. Accordingly, a voltage level of 35 volts is used to define a binary value of '1' and a voltage level of 0 volts is used to define a binary value of '0'. Based on the values of resistors 425–430, the value of capacitor 415, and the specific type of photoelectric diode used in sensor 410 a predetermined illumination range is detected by converter 400. Accordingly, converter 400 generates a binary '1' on output 460 when an illumination source that passes the predetermined illumination range is placed in close proximity to sensor 410.

Figure 5:
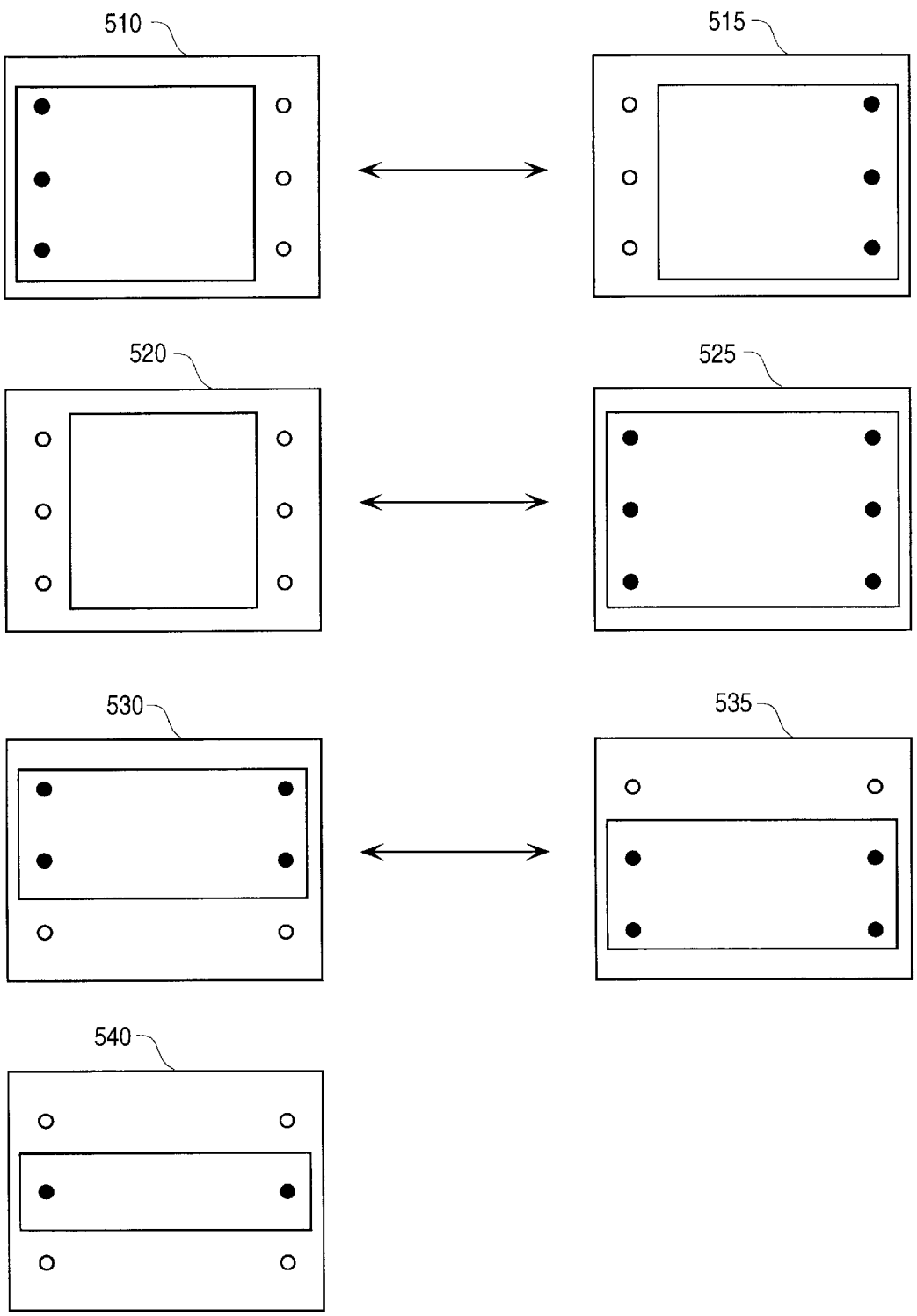
FIG. 5 illustrates size and center image distortions.

FIG. 5 illustrates size and center distortions. In particular, based on the number and location of sensors illuminated, the type of size/center image distortion is ascertained by microprocessor 315. For one embodiment, microprocessor 315 uses this preliminary evaluation to adjusts driver 320 via the afore-mentioned control signals. Images 510 through 540 show an example of possible size and center distortions. In image 510 only the left side sensors are illuminated, thus indicating a horizontal alignment distortion. Similarly, in image 515 only the right side sensor are illuminated, thus indicating a horizontal alignment distortion. In image 520 none of the sensor are illuminated, thus indicating a possible size distortion. Alternatively, in image 535 all the sensor are illuminated, thus indicating a correct image or an enlargement distortion.

In image 530, the bottom sensors are not illuminated, thus indicating a positive vertical alignment distortion. Similarly, in image 535 the top sensors are not illuminated, thus indicating a negative vertical alignment distortion. Finally, in image 540 only the center sensors are illuminated, thus indicating a vertical size distortion. Using these initial image distortions, microprocessor corrects size and center distortions by adjusting the CRT 330's electron beam via driver 320.

Figure 6:
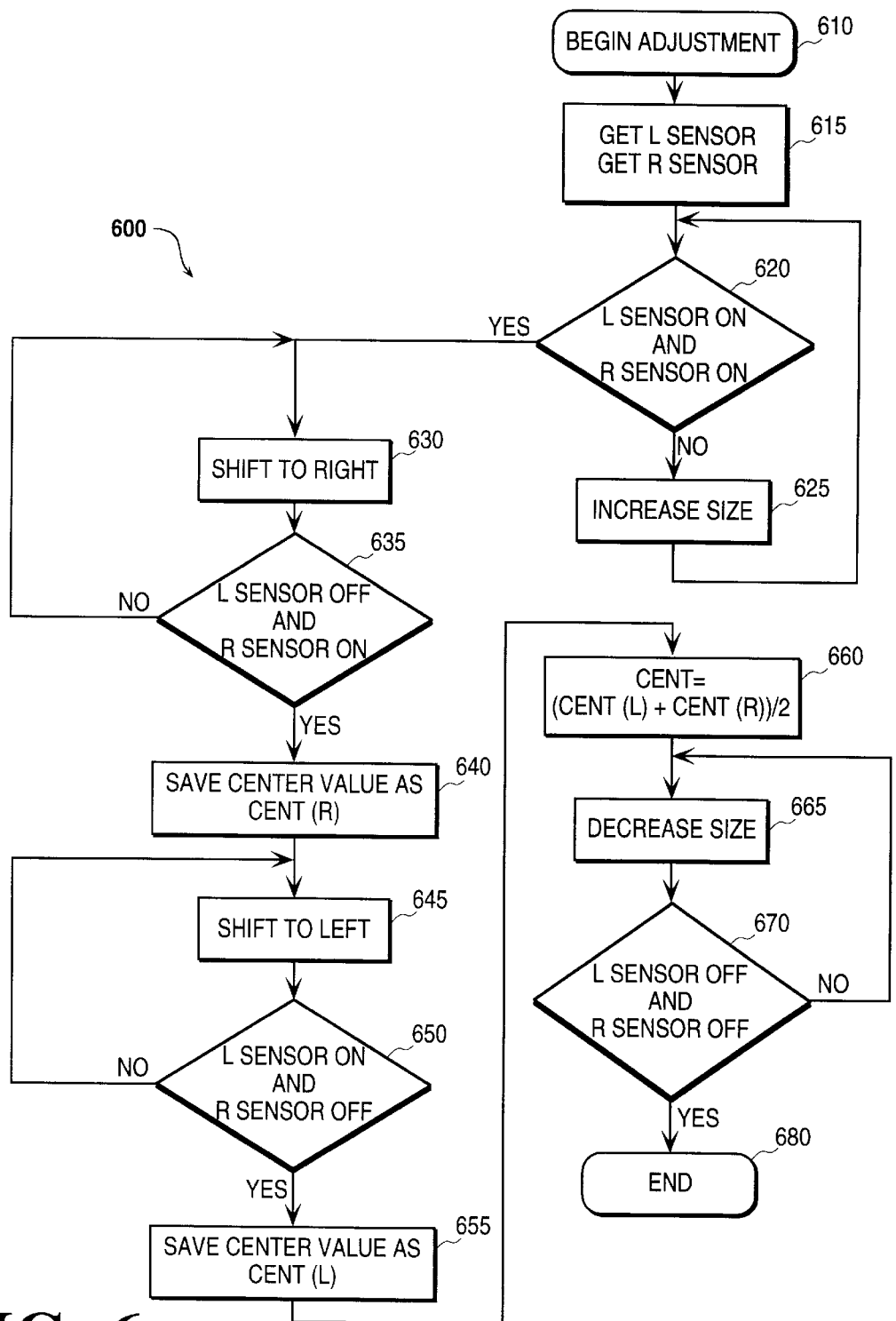
FIG. 6 illustrates a state machine diagram for correcting image distortions in a monitor.

FIG. 6 illustrates one embodiment of a state machine diagram for implementing image correction in a self adjusting monitor. In particular, state diagram 600 shows the state transitions followed by microprocessor 315 during size and center adjustments of a monitor. For one embodiment, the monitor includes two sensors. The first sensor is located at the midpoint of the monitor's left screen edge, hereinafter left sensor. The second sensor is located at the midpoint of the monitor's right screen edge, hereinafter right sensor. For alternative embodiments, the monitor includes multiple sensors. Accordingly, for multiple sensors the number of state transitions in state diagram 600 increases because microprocessor 315 receives additional inputs.

State 610 is the initial state in state diagram 600. In state 610, a computer system coupled to the self adjusting monitor displays an image on the monitor's screen. For one embodiment, state 610 occurs during a reset of the computer system coupled to the self adjusting monitor. For an alternative embodiment, state 610 occurs when a button is depresses on the self adjusting monitor. For yet another embodiment, state 610 occurs when a unique key combination is depressed on a keyboard coupled to the computer system. Provided state 610 is reached, state diagram 600 transitions to state 615.

In state 615, microprocessor 315 obtains sensor data from converter 310. In particular, for one embodiment, a predetermined image is displayed on CRT 330. The predetermined image results in the illumination or non-illumination of the left sensor. Similarly, the predetermined image results in the illumination or non-illumination of the right sensor. Accordingly, in state 615, the sensor data from each sensor is converted to digital data, via converter 310, and transferred to microprocessor 315. Provided microprocessor 315 receives the sensor data, state diagram 600 transitions to state 620. In state 620, microprocessor 315 examines the sensor data to determine which sensor is illuminated. For one embodiment, a logic '1' value from converter 310 indicates that the sensor is illuminated. Accordingly, a '0' value for both the left sensor and the right sensor indicates that neither of the sensors is illuminated, hereinafter a non-illuminated sensor is denoted as an off sensor. Provided neither of the sensors is off, state diagram 600 transitions to state 625.

In state 625, microprocessor 315 increases the size of the predetermined image. In particular, in state 625 microprocessor 315 increases the horizontal dimension of the predetermined image. For one embodiment, microprocessor 315 uses driver 320's horizontal size adjust signal to increases the horizontal dimension of the predetermined image. After an initial size increase, state diagram 600 returns to state 620. As previously described, in state 620 microprocessor 315 determines whether both the left and right sensors are illuminated. Provided neither of the sensors is off, state diagram 600 returns to state 625. State diagram 600 continues to transition between state 620 and state 625 until both sensors are illuminated. Accordingly, states 620 and 625 allow microprocessor 315 to incrementally increase the size of predetermined image. Provided both the left and right sensor are illuminated, state diagram 600 transitions to state 630.

In state 630, microprocessor 315 begins the horizontal adjustment of the predetermined image using the left sensor. In particular, in state 630 microprocessor 315 shifts the predetermined image to the right edge of the monitor's screen. For one embodiment, microprocessor 315 uses driver 320's horizontal center adjust signal to shift the predetermined image. After an initial right shift, state diagram 600 transitions to state 635. In state 635, microprocessor 315 determines whether the left sensor is off. Provided the left sensor is illuminated, state diagram 600 returns to state 630. State diagram 600 continues to transition between state 630 and state 635 until the left sensor is off. Accordingly, states 630 and 635 allow microprocessor 315 to incrementally shift the predetermined image to the monitor screen's right edge. Provided the left sensor is off, state diagram 600 transitions to state 640.

In state 640, microprocessor 315 stores the right center value of the predetermined image. The right center value is used to determine the predetermined image's furthest right boundary relative to the left sensor. Subsequent to determining the right center value, state diagram 600 transitions to state 645.

In state 645, microprocessor 315 begins the left horizontal adjustment of the predetermined image using the right sensor. In particular, in state 630 microprocessor 315 shifts the predetermined image to the left edge of the monitor's screen. For one embodiment, microprocessor 315 uses driver 320's horizontal center adjust signal to shift the predetermined image. After an initial left shift, state diagram 600 transitions to state 650. In state 650, microprocessor 315 determines whether the right sensor is off. Provided the right sensor is illuminated, state diagram 600 returns to state 645. State diagram 600 continues to transition between state 645 and state 650 until the right sensor is off. Accordingly, states 645 and 650 allow microprocessor 315 to incrementally shift the predetermined image to the monitor screen's left edge. Provided the left sensor is off, state diagram 600 transitions to state 655.

In state 655, microprocessor 315 stores the left center value of the predetermined image. The left center value is used to determine the predetermined image's furthest left boundary relative to the right sensor. Subsequent to determining the left center value, state diagram 600 transitions to state 660. In state 660, microprocessor 315 calculates the center location of the predetermined image by averaging the right center value and the left center value.

For one embodiment, microprocessor 315 adjusts the center location of the monitor using the center location calculated in state 660. In particular, microprocessor 315 calibrates system 300's electron beam, via driver 320, in accordance with the center position calculated in state 660. Accordingly, location distortions are reduced from images displayed by the monitor. Subsequent to the center calculation, state diagram 600 transitions to state 665. In the present embodiment, because of the left and right sensor's location on the monitors screen, microprocessor 315 increments driver 320's horizontal center adjust to orient the predetermined image. For alternative embodiments, however, multiple sensors located in different areas of the monitor screen are contemplated. Accordingly, microprocessor 315 uses a combination of driver 320's horizontal center adjust and vertical center adjust to determine the center position of the predetermined image.

In state 665, microprocessor 315 further adjusts the size of the predetermined image. In particular, the size expansion of state 620 is reduced until the dimensions of the predetermined image coincide with the dimensions of the monitor. Accordingly, in state 665 microprocessor 315 decreases the size of the predetermined image. For one embodiment, microprocessor 315 uses driver 320's horizontal size adjust signal to decreases the size of the predetermined image. After an initial size decrease, state diagram 600 transitions to state 670. In state 670, microprocessor 315 determines whether both sensors are off. Provided either sensor is illuminated, state diagram 600 returns to state 655. State diagram 600 continues to transition between state 655 and state 670 until both sensors are off. Accordingly, states 655 and 670 allow microprocessor 315 to incrementally decreases the size of the predetermined image to coincide with the monitor's dimensions. Provided both sensors are off, state diagram 600 transitions to state 680.

In state 680, microprocessor 315 stores the size and center adjustments of the predetermined image. For one embodiment, microprocessor 315 adjusts the size and center display of the monitor using the size adjustments derived in state 680. In particular, microprocessor 315 calibrates system 300's electron beam, via driver 320, in accordance with the size and center adjustments calculated in state 660. Accordingly, size and center distortions are reduced from images displayed by the monitor. For alternative embodiments, multiple sensors located in different areas of the monitor screen are contemplated. Accordingly, microprocessor 315 uses a combination of both the horizontal size adjust and the vertical size adjust to adjust the size of the predetermined image.

State diagram 600 illustrates the state transitions used by system 300 to implement size and center image correction in a self adjusting monitor with two sensors. Varying the location and number of sensors allows for the detection of different distortions. In particular, a specific type of image distortion is ascertained by microprocessor 315 based on the number and location of illuminated sensors. For one embodiment, microprocessor 315 applies this preliminary evaluation to a predetermined image displayed by system 300. Subsequently, driver 320 is adjusted to remove the distortion from the predetermined image via the horizontal size adjust, horizontal center adjust, vertical size adjust, vertical center adjust, rotation adjust, barrel adjust, and trapezoid adjust control signals. For one embodiment, microprocessor 315 calibrates system 300's electron beam, via driver 320, in accordance with the afore-mentioned control signals. Accordingly, distortions are reduced from images displayed by system 300's monitor.

Figure 7:
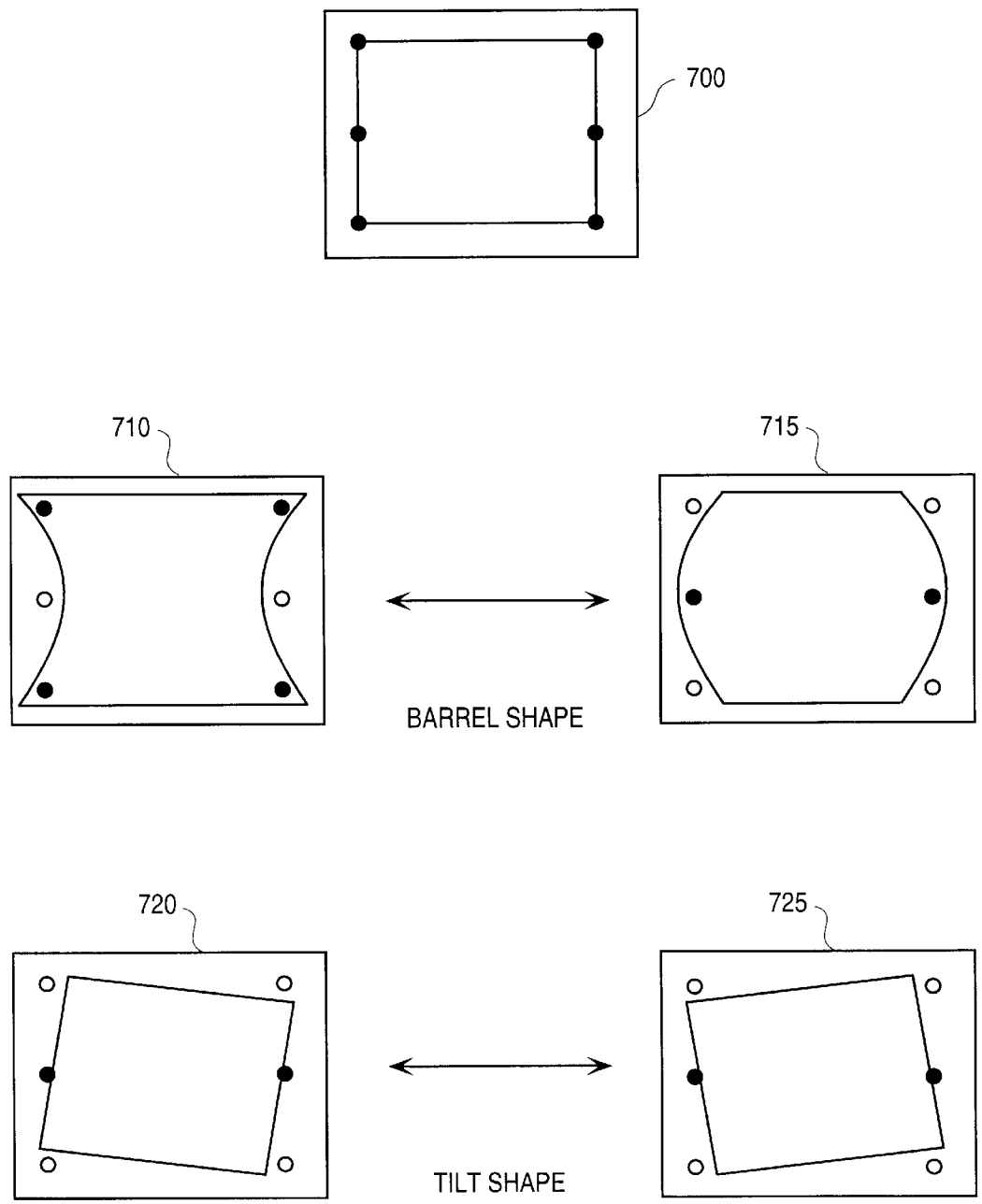
FIG. 7 illustrates geometrical distortions in a video monitor.
Figure 8:
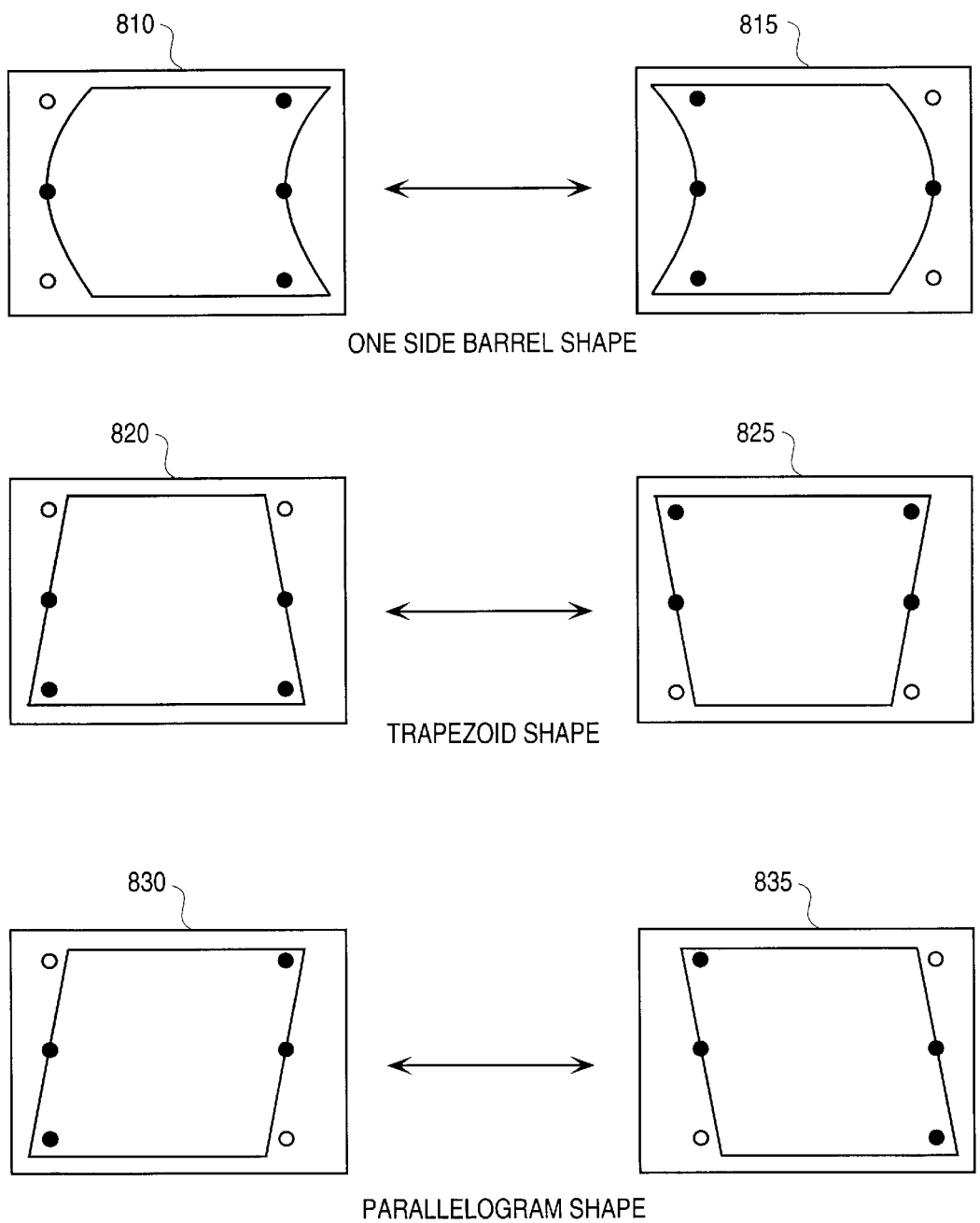
FIG. 8 illustrates geometrical distortions in a video monitor.

FIGS. 7 and 8 show examples of possible distortions isolated by system 300's six sensors. In particular, FIG. 7 illustrates the correlation between sensors and the detection of barrel and tilt shape distortions. Image 700 shown an image without any distortions. As illustrated in FIG. 7, the non-distorted image's borders align with the six sensors. Accordingly, all six sensor are illuminated. In the distorted images, however, a subset of the sensors are off.

Images 710–725 shows four possible image distortions found on system 300's display. In particular, images 710 and 715 show examples of a barrel shape distortion. In image 710 the left-center sensor and the right-center sensor are off. In image 715 the top-left, top-right, bottom-left, and bottom-right sensor are off. For one embodiment, using the detection of illuminated/non-illuminated sensor microprocessor 315 identified the barrel distortion shown in image 710 and image 715. Accordingly microprocessor 315 uses the control signals horizontal size adjust, horizontal center adjust, vertical size adjust, vertical center adjust, and barrel adjust to remove the barrel distortion from the displayed image.

Images 729 and 725 show examples of tilt shape distortions. In both images the top-left, top-right, bottom-left, and bottom-right sensor are off. For one embodiment, using the detection of illuminated/non-illuminated sensor microprocessor 3315 identified the tilt distortion shown in image 720 and image 725. Accordingly microprocessor 315 uses the control signals horizontal size adjust, horizontal center adjust, vertical size adjust, vertical center adjust, and rotation adjust to remove the tilt distortion from the displayed image.

FIG. 8 illustrates the correlation between system 300's six sensors and the detection of one-sided barrel shape, trapezoid shape, and parallelogram shape distortions. Images 810 and 815 show examples of a one-sided barrel shape distortion. In image 810 the left-top sensor and the left-bottom sensor are off. Similarly, in image 815 the right-top sensor and the right-bottom sensor are off. For one embodiment, using the detection of illuminated/non-illuminated sensor microprocessor 3315 identified the one-sided barrel distortions shown in images 810 and 815. Accordingly microprocessor 315 uses the control signals horizontal size adjust, horizontal center adjust, vertical size adjust, vertical center adjust, rotation adjust and barrel adjust to remove the barrel distortion from the displayed image.

Images 820 and 825 show examples of a trapezoid shape distortion. In image 820 the left-top sensor and the right-top sensor are off. Similarly, in image 825 the right-bottom sensor and the left-bottom sensor are off. For one embodiment, using the detection of illuminated/non-illuminated sensor microprocessor 3315 identified the trapezoid distortions shown in images 820 and 825. Accordingly microprocessor 315 uses the control signals horizontal size adjust, horizontal center adjust, vertical size adjust, vertical center adjust, and trapezoid adjust to remove the barrel distortion from the displayed image Images 830 and 835 show examples of a parallelogram shape distortion. In image 830 the left-top sensor and the right-bottom sensor are off. Similarly, in image 835 the right-bottom sensor and the left-top sensor are off. For one embodiment, using the detection of illuminated/non-illuminated sensor microprocessor 3315 identified the parallelogram distortions shown in images 830 and 835. Accordingly microprocessor 315 uses the control signals horizontal size adjust, horizontal center adjust, vertical size adjust, vertical center adjust, rotation adjust, barrel adjust, and trapezoid adjust to remove the parallelogram distortion from the displayed image.

The placement of multiple sensors allows system 300 to identify many different image distortions in a video monitor. Accordingly, the placement of multiple sensors in conjunction with driver 320's multiple control signals allow the correction of different image distortions. FIG. 7 and FIG. 8 illustrate different image distortions in a monitor with six sensor located on the edge of the monitor. For alternative embodiments, however, additional sensor located throughout the surface of the monitor are contemplated.

Accordingly, the increased number of sensors allow for the identification and subsequent correction of additional distortions.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A display operable to automatically adjust image misalignment, the display comprising:
    a driver, the driver operable to generate images;
    a screen coupled to the driver, the screen displaying the generated images by illuminating an area of the screen;
    a plurality of sensors integrated in the screen for aligning the generated images on the screen, each sensor detecting illumination of the screen on an area below the sensor; and
    a circuit coupled to the plurality of sensors and the driver, the circuit configured to automatically determine center values of the generated images on the screen based on the center values of the generated images.

2. The display of claim 1, wherein said circuit comprises:
    a converter coupled to said plurality of sensors, said converter operable to convert an output of said plurality of sensors indicating illumination of a set of said plurality of sensors to a digital output; and
    a processor coupled to said converter and said driver, said processor correlating said digital output to an adjust signal, wherein said adjust signal adjusting said driver.

3. The display of claim 1, wherein said display automatically adjusts geometric distortions.

4. The display of claim 1, wherein said display automatically adjusts convergence distortions.

5. The display of claim 1, wherein said plurality of said sensors detect illumination of said screen on an area above said sensor.

6. The display of claim 1, wherein said plurality of sensor comprise photo-electric diodes located on the border of said screen.

7. The display of claim 1, wherein said plurality of sensor comprise transparent photo-electric diodes.

8. The display of claim 1, wherein said display comprises a video monitor.

9. The display of claim, 8 wherein said video monitor further comprises a cathode ray tube.

10. The display of claim 1, wherein said display comprises a flat panel display.

11. A method for automatically adjusting image misalignments of a video monitor, said method comprising:
    (A) generating a predetermined image on a screen of said video monitor;
    (B) using a plurality of sensors integrated in the screen for aligning the predetermined image and determining an area of the screen covered by the predetermined image;
    (C) generating a set of control signals based on said area of said screen covered by said predetermined image;
    (D) adjusting said generation of said predetermined image; and
    (E) determining automatically center values of the predetermined image.

12. The method of claim 11, wherein (B)–(E) are repeated until distortions are removed from said predetermined image.

13. The method of claim 12, wherein adjustment of said predetermined image is used on images generated by said video monitor.

14. The method of claim 11, wherein said plurality of sensors comprise photo-electric diodes located on the border of said screen.

15. The method of claim 11, wherein the plurality of sensors comprise transparent photo-electric diodes.

16. The method of claim 11, wherein said method automatically adjusts geometric distortions.

17. The method of claim 11, wherein said method automatically adjusts convergence distortions.

* * * * *